United States Patent [19]

Powell et al.

[11] Patent Number: 4,870,529
[45] Date of Patent: Sep. 26, 1989

[54] ACTIVE ARC PROTECTION CIRCUIT

[75] Inventors: Robert J. Powell, Glendale Heights; Robert A. Holzrichter, Chicago, both of Ill.

[73] Assignee: DisplayTEK, Inc., Elgin, Ill.

[21] Appl. No.: 248,235

[22] Filed: Sep. 19, 1988

Related U.S. Application Data

[63] Continuation of Ser. No. 925,210, Oct. 31, 1986, abandoned.

[51] Int. Cl.$^4$ .............................................. H02H 9/04
[52] U.S. Cl. ........................................ 361/56; 361/91; 361/94; 361/101; 358/190; 315/409
[58] Field of Search ...................... 361/6, 8, 9, 13, 56, 361/54, 58, 89, 91, 94, 101, 100; 358/174, 190, 243; 363/50, 51, 56; 315/409, 410

[56] References Cited

U.S. PATENT DOCUMENTS

| | | | |
|---|---|---|---|
| 3,499,104 | 3/1970 | Austin | 178/5.4 |
| 3,535,436 | 10/1970 | Limberg | 178/5.4 |
| 3,541,234 | 10/1970 | Austin | 178/5.4 |
| 3,908,159 | 9/1975 | Griffey | 358/190 X |
| 4,197,558 | 4/1980 | Rutishauser | 358/39 |
| 4,441,137 | 4/1984 | Harwood | 361/56 X |
| 4,595,941 | 6/1986 | Avery | 361/91 X |

Primary Examiner—Todd E. DeBoer
Attorney, Agent, or Firm—Willian Brinks Olds Hofer Gilson & Lione

[57] ABSTRACT

An arc protection circuit is disclosed for protecting a component, such as a transistor, from the effects of arcs developed in a CRT. The protection circuit includes an arc sensing circuit coupled to the component to be protected so as to sense the presence of an arc-induced transient voltage, in response to which the sensing circuit rapidly assumes a first state. An active current switch is coupled to the protected component and is responsive to the first state of the sensing circuit for rapidly assuming a low impedance state to shunt arc-induced current away from the component.

8 Claims, 2 Drawing Sheets

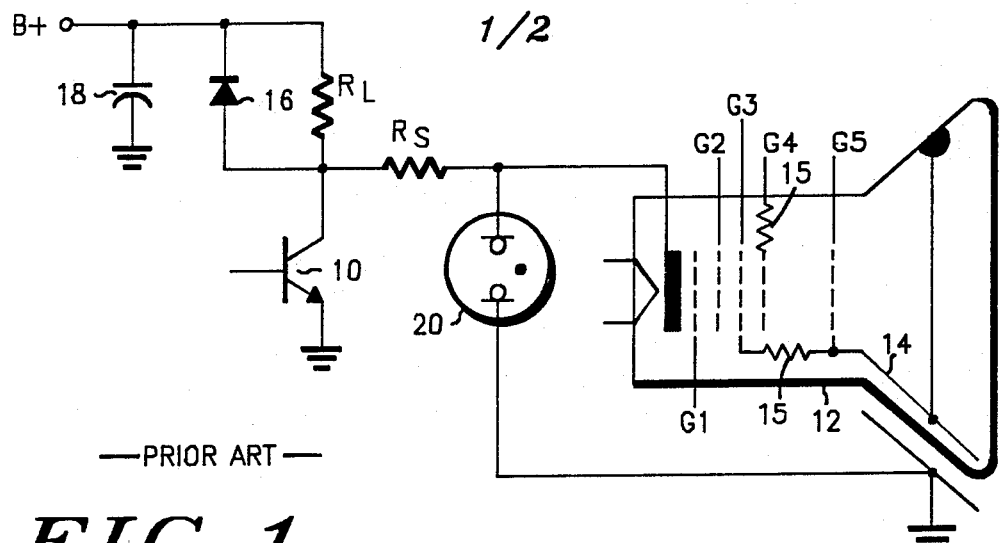
—PRIOR ART—
FIG. 1
FIG. 3
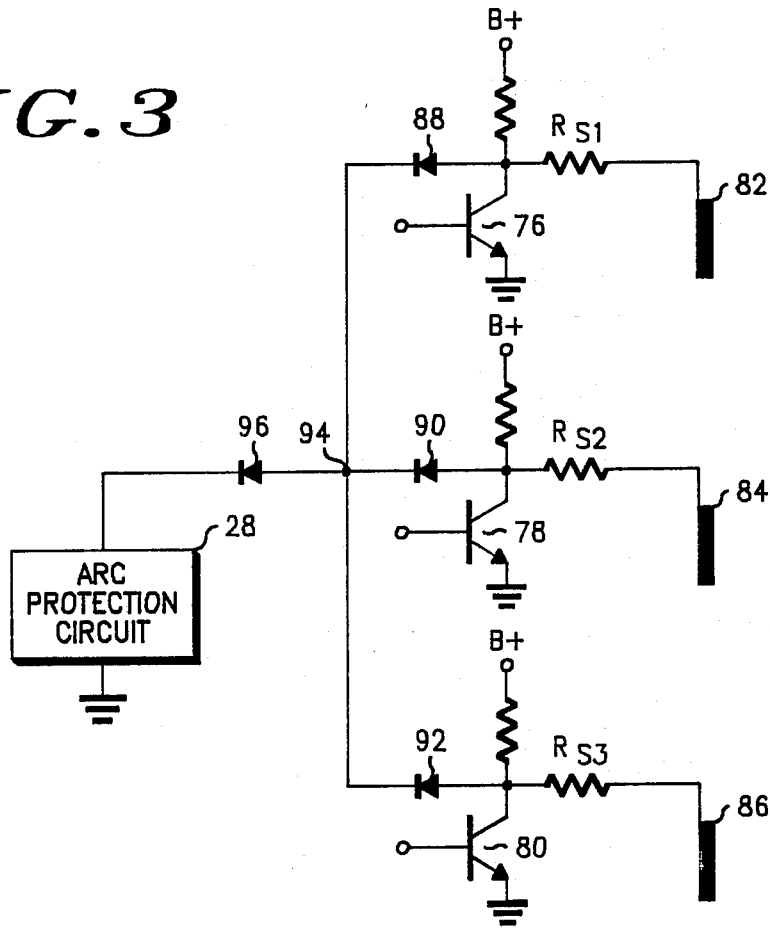

ACTIVE ARC PROTECTION CIRCUIT

This application is a continuation of application Ser. No. 06/925,210, filed Oct. 31, 1986, now abandoned.

FIELD OF THE INVENTION

This invention pertains to the field of arc protection, and particularly to circuitry for protecting transistors and other fragile components from the effects of arcs developed in CRT's (cathode ray tubes).

BACKGROUND OF THE INVENTION

CRT displays such as video monitors and television receivers routinely include one or more components whose sole function is to protect more fragile components from arcs developed in the CRT. Typically, the solid state video amplifier which drives one or more electrodes in the CRT is the device which requires such protection.

A conventional technique for protecting a video amplifier is shown in FIG. 1. In the illustrated arrangement, a transistor 10 represents a protected video amplifier having a load resistor $R_L$ and a series impedance $R_s$ connected between the collector of the transistor 10 and the cathode of a CRT 12. This particular CRT may be of the "soft flash" type which includes an internal, aquadag coating 14 and a current limiting resistance of about 12K ohms represented by the resistors 15.

When the CRT's electron gun arcs across the gap between the cathode and the G3 electrode which is at high potential, the resistors 15 limit the typical arc to a peak current of about 1.5 amps. The arc causes the voltage at the collector of the transistor 10 to rise rapidly, whereupon a diode 16 conducts in an attempt to hold the collector voltage to a level only slightly higher than B+. If the capacitance 18 associated with the B+ supply is large enough and if the forward voltage of the diode 16 is low enough, the voltage at the collector of the video amplifier will be held to a relatively low value. A microsecond or so after the arc, the gas in a plasma tube 20 ionizes, whereupon the plasma tube acts as a short circuit which shunts to ground most of the arc-supporting energy which was stored by the capacitance associated with the aquadag 14.

For conventional CRT displays that do not require video amplifiers with wide bandwidths, the arrangement of the diode 16 and the plasma tube 20 may provide adequate arc protection so long as the series resistance $R_s$ is sufficiently high. For high frequency CRT displays, the video amplifier may need to have a bandwidth in excess of 100 MHz, and it is this need for such a wide bandwidth that gives rise to inadequacies in the conventional arc protection circuit.

When a wide bandwidth video amplifier is required, the amplifier itself must use a transistor having a fast, delicate geometry and operate with low source impedances. With reference to FIG. 1, this would mean lowering the value of the resistance $R_s$ to avoid the bandwidth rolloff caused by the combination of a relatively higher value $R_s$ in combination with the cathode input capacity of the CRT. Lowering the value of $R_s$ reduces the efficacy of the illustrated arc protection devices, particularly when more delicate, high frequency transistors are used as video amplifiers.

The problem is further aggravated by the fact that transistors with the required characteristics of high $F_t$, low output capacity, etc. tend to have a low breakdown voltage, typically in the range of 18 to 20 volts $BV_{ceo}$. To provide sufficient video drive to the CRT, typically 30 volts peak-to-peak, the transistor output devices operate near their maximum ratings and are, therefore, susceptible to avalanche breakdown and consequent failure if an arc causes them to operate beyond their maximum rating even during the one microsecond interval required to fire the plasma tube 20. For this additional reason, the arc protection circuitry of FIG. 1 is inadequate for CRT displays using wide bandwidth video amplifiers or other components which are susceptible to damage by arcs.

OBJECTS OF THE INVENTION

It is a general object of the invention to provide an improved arc protection circuit.

It is a more specific object of the invention to provide an arc protection circuit that operates more quickly than conventional protection circuits and which is particularly suited for use with relatively delicate components such as wide bandwidth output devices.

BRIEF DESCRIPTION OF THE FIGURES

FIG. 1, referred to above, illustrates a conventional technique for protecting a video amplifier from an arc developed in a CRT;

FIG. 3 shows a circuit arrangement for protecting three video amplifiers by use of the arc protection circuit shown in FIG. 2.

DESCRIPTION OF THE PREFERRED EMBODIMENT

Figure 2:
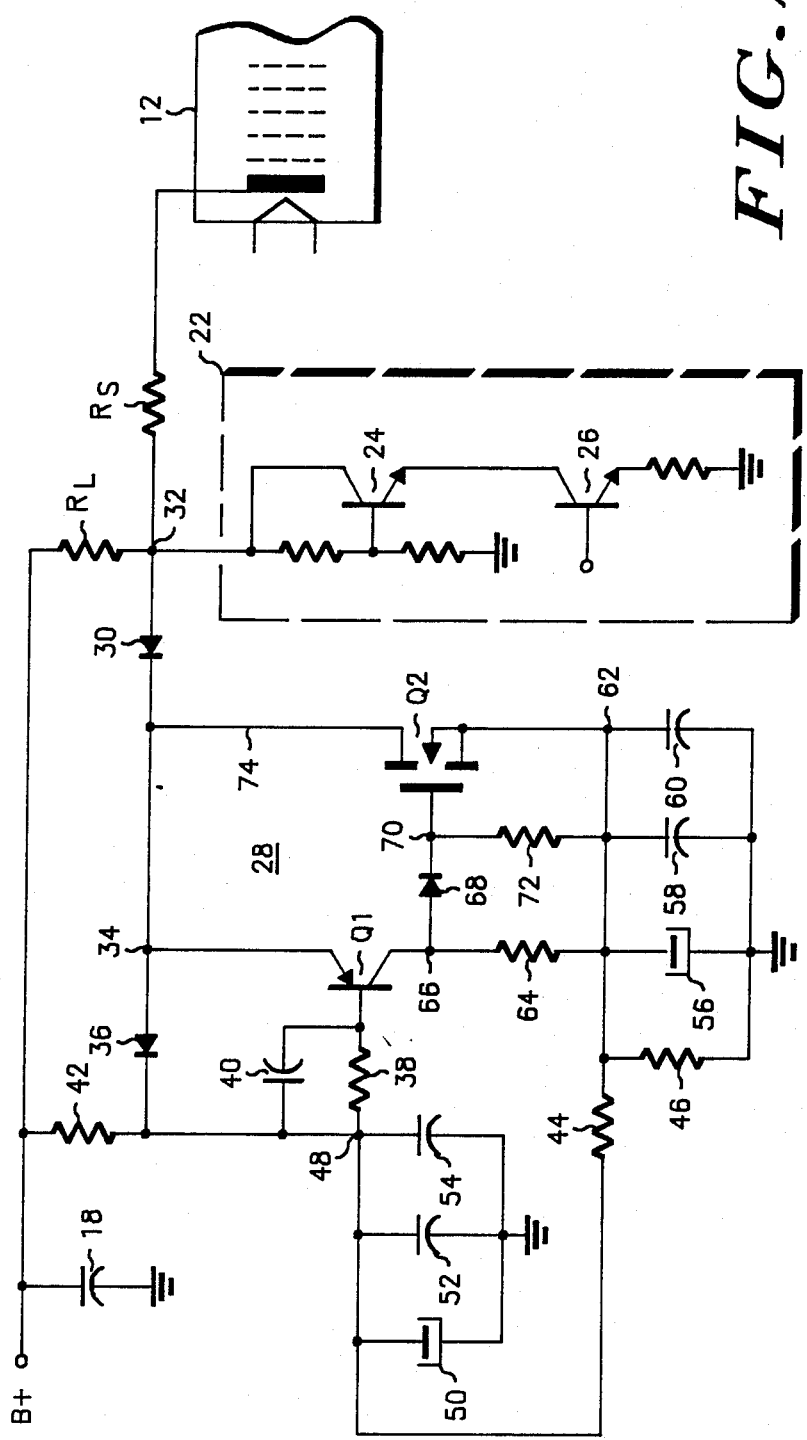
FIG. 2 is a schematic diagram of an arc protection circuit according to the invention.

Referring now to FIG. 2, the CRT 12 is shown being driven by a wide bandwidth video amplifier 22 comprising high frequency transistors 24 and 26 and their associated biasing resistors. The video amplifier is coupled, as shown, to a load resistor $R_L$ and to a another resistor $R_s$ in series with the cathode of the CRT 12. Except for the B+ capacitance 18, the remainder of the illustrated circuitry constitutes an active arc protection circuit 28 which is provided to protect desired components (here, the video amplifier 22) from damage caused by arcs.

The illustrated arc protection circuit 28 is coupled to the amplifier 22 via a diode 30 so that, when the diode 30 is off (during non-arc conditions), the capacitance associated with the protection circuit 28 is isolated from the video amplifier's load $R_L$. When an arc occurs, the voltage on the video amplifier (at node 32) rises quickly and turns on the diode 30. The initiation of that arc is detected by an arc sensing circuit which includes a transistor Q1. As is described in more detail below, the arc sensing circuit assumes a first state by the conduction of Q1 for turning on an active current switch which includes a transistor Q2. With the transistor Q2 on, the current switch assumes a low impedance state for shunting arc-induced current away from the video amplifier 22.

Referring again to the arc sensing circuit, the emitter of the transistor Q1 is coupled to the cathode of the diode 30 (via node 34) and to the anode of another diode 36. The cathode of the diode 36 is coupled to the base of the transistor Q1 via an RC network comprising a resistor 38 and a capacitor 40. A biasing network comprising resistors 42, 44 and 46 is coupled between B+ and ground to provide a positive bias voltage at node 48 to hold Q1 off in quiescent (no arcing) conditions. The diode 36 is also non-conductive at this time.

A capacitance network comprising capacitors 50, 52 and 54 is coupled to the node 48 to provide an AC bypass thereat for low, mid-band, and high frequencies. A similar network comprising capacitors 56, 58 and 60 provides the same type of AC bypass at node 62.

The collector of the transistor Q1 is coupled to a load resistor 64 at nod 66. The same node is coupled via a diode 68 to the gate (node 70) of Q2 which is illustrated as an enhancement mode FET which is off under quiescent (no arc) conditions. A resistor 72 is coupled between the node 70 and the capacitance network at node 62 to drain charge from the gate of the transistor Q2. The source of the transistor Q2 is coupled directly to the node 62 to receive a voltage developed across the resistor 46 for holding the source of Q2 at a positive potential that is selected to avoid excessive source-drain voltage under quiescent conditions. (The collector of transistor Q1 is biased up by resistor 46 for the same reason.) As is described in detail below, the occurrence of an arc causes transistor Q2 to turn on to shunt arc-induced current to ground via drain lead 74 which is coupled to the video amplifier 22 via the diode 30.

Preferably, the diodes 30, 36 and 68 are fast, low capacity diodes such as type 1N5282. The transistor Q1 is a fast PNP such as type 2N5583, and the transistor Q2 is a TMOS FET such as type BS170. The fast acting properties of these components is preferred to achieve the rapid operation now to be described When an arc occurs, the voltage at node 32 rises rapidly. This transient voltage spike is coupled to the emitter of transistor Q1 via the diode 30. Meanwhile, the voltage at the base of the transistor Q1 is held nearly constant at the quiescent bias level established at node 48 because of the capacitance network thereat (capacitors 50, 52 and 54) and the capacitor 40 which couples the node 48 to the base of transistor Q1. Accordingly, the diode 36 experiences an initially high forward voltage (about 5 volts) across itself. This results in a correspondingly high forward voltage across the emitter-base junction of the transistor Q1, thereby turning Q1 on hard and fast. As the voltage across the capacitor 40 gradually increases, the voltage across the emitter-base junction of transistor Q1 decays to a lower level. This operation results in a rapid initial voltage rise at the node 66 followed by a gradual decay.

The diode 68, including the stray capacitance across it, couples the fast voltage rise at node 66 to the gate of the transistor Q2. The latter device responds by turning on hard to create a low impedance path between the nodes 34 and 62 for shunting arc-induced current from the video amplifier 22.

As the transistor Q2 conducts, the voltage at the nodes 32 and 34 drops rapidly, thereby turning off the transistor Q1. Consequently, the voltage at node 66 experiences a similar drop, but that voltage drop is not felt immediately at the gate of the transistor Q2. Instead, the voltage at the gate of the transistor Q2 is temporarily held at its previously established value by the input capacity of the transistor Q2. The diode 68 is now reversed biased, wherefore the gate voltage decays by virtue of charge drainage through the resistor 72. Accordingly, the transistor Q2 is temporarily held on for a duration determined by the time constant associated with the resistor 72 and the input capacity of the transistor Q2. This time constant is preferably selected to hold the transistor Q2 on in a low impedance state for at least the anticipated duration of an arc to ensure that all transient voltages caused by the arc will have dissipated before permitting the transistor Q2 to turn off. A hold-on time of about 100 microseconds has been found to be effective in preventing damage to the video amplifier 22.

The illustrated arc protection circuit turns on Q2 within about 40 nanoseconds after an arc begins. That is shorter than the normal time required for the plasma tube 20 (FIG. 1) to fire. Thus, where this protection circuit is used, a plasma tube is not required. Further, the rapid turn-on of the transistor Q2 ensures that the video amplifier is exposed to potentially damaging transients for a time period which is too short to damage the transistors in the video amplifier. In one application of this circuit, a wide bandwidth video amplifier survived three hundred test arcs without being protected by a plasma tube.

Although the embodiment of FIG. 2 shows protection for a single video amplifier that drives the cathode of a CRT, the same protection circuit may be employed to protect an amplifier coupled to the grid of a CRT. Further, one of the protection circuits may be used to protect three video amplifiers which drive three CRT cathodes, as in the usual arrangement for color CRT's. This is illustrated in FIG. 3.

The arrangement depicted in FIG. 3 includes three video amplifiers 76, 78 and 80 coupled, respectively, to CRT cathodes 82, 84 and 86 via series resistors $R_{s1}$, $R_{s2}$ and $R_{s3}$. Diodes 88, 90 and 92 couple the amplifiers to a common node 94. The arc protection circuit 28 is coupled to the same node via a diode 96. In this manner, all three amplifiers are simultaneously protected from arcs by the single arc protection circuit 28.

Although the devices which have been illustrated as being protected by the invention are solid state devices, the invention may also be used to protect other components from damage due to arcs. Further, it will be obvious to those skilled in the art that various alterations and modifications may be made to the illustrated protection circuit without departing from the invention. Accordingly, it is intended that all such alterations and variations will be considered as within the spirit and scope of the invention as defined by the appended claims.

What is claimed is:

1. An active arc protection circuit including a terminal adapted for connection to a CRT display having a component which is susceptible to arc damage, the protection circuit comprising:
    a transistor assuming a conductive state when an arc begins;
    a turn-on network coupled to the transistor and responsive to the initiation of the arc for rapidly applying to the transistor an initially high turn-on bias voltage;
    switching means having a normally high impedance state coupled to the terminal and responsive to the conductive state of the transistor for rapidly assuming a low impedance state to shunt arc-induced current away from the terminal; and
    RC network means for holding the switching means in the low impedance state for a predetermined duration, said duration being longer than the duration of said arc, said switching means automatically reverting to its normally high impedance state after said predetermined duration.

2. The arc protection circuit as set forth in claim 1 wherein the transistor assumes a non-conducting state in response to the low impedance state of switching means.

3. An arc protection circuit as set forth in claim 2 wherein the switching means includes at least one transistor which forms a path for sinking arc-induced current and which is rendered conductive in response to the conductive state of the transistor.

4. An active arc protection circuit including a terminal adapted for connection to a component which is susceptible to arc damage, comprising:
a transistor coupled to the terminal and assuming a conductive state when an arc begins;
a turn-on network coupled to the transistor and responsive to the initiation of the arc for rapidly applying to the transistor an initially high turn-on bias;
switching means coupled to the terminal so as to shunt arc-induced current away from said terminal when the switching means is conductive; and
means for coupling the transistor to the switching means so as to rapidly turn on the switching means in response to conduction by the transistor, and for temporarily holding the switching means on for a preselected holding period after the transistor turns off, said holding period being longer than the duration of said arc, wherein said means for coupling includes a diode coupling the transistor to the switching means and an RC network coupled to the diode and to the switching means so as to couple a turn-on voltage from the transistor to the switching means when the transistor becomes conductive, and to temporarily hold at least part of the turn-on voltage at the switching means after the transistor turns off.

5. An arc protection circuit as set forth in claim 4 wherein the transistor and the switching means are coupled to the terminal via a diode so as to isolate any capacitance associated with said transistor and said switching means from the component.

6. The arc protection circuit of claim 4 wherein said switching means comprises a transistor and the capacitor of said RC network comprises the input capacitance of said transistor.

7. An active arc protection circuit including a terminal adapted for connection to a component which is susceptible to arc damage, comprising:
a transistor assuming a conductive state when an arc begins;
a turn-on network coupled to the transistor and responsive to the initiation of an arc for applying to the transistor an initially high but decaying turn-on bias so as to rapidly turn the transistor on;
switching means coupled to the terminal so as to shunt arc-induced current away from said terminal when the switching means is turned on;
a diode coupling the transistor to an input electrode of the switching means so as to turn the switching means on in response to the transistor being on; and
RC network means coupled to the input electrode of the switching means for temporarily holding the switching means on after the transistor turns off.

8. The arc protection circuit of claim 7 wherein said switching means comprises a transistor and the capacitor of said RC network means comprises the input capacitance of said transistor.

* * * * *